(12) United States Patent
Gresset et al.

(10) Patent No.: US 11,258,488 B2
(45) Date of Patent: Feb. 22, 2022

(54) METHOD FOR TRANSMITTING, COMPUTER PROGRAM PRODUCT, AND TRANSMITTER

(71) Applicant: MITSUBISHI ELECTRIC CORPORATION, Tokyo (JP)

(72) Inventors: Nicolas Gresset, Rennes (FR); Victor Exposito, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/040,773

(22) PCT Filed: May 10, 2019

(86) PCT No.: PCT/JP2019/019598
§ 371 (c)(1),
(2) Date: Sep. 23, 2020

(87) PCT Pub. No.: WO2019/225485
PCT Pub. Date: Nov. 28, 2019

(65) Prior Publication Data
US 2021/0006311 A1    Jan. 7, 2021

(30) Foreign Application Priority Data

May 24, 2018 (EP) ..................... 18305635

(51) Int. Cl.
*H04B 7/04* (2017.01)
*H04B 7/0456* (2017.01)
(Continued)

(52) U.S. Cl.
CPC .......... *H04B 7/0456* (2013.01); *H04L 5/006* (2013.01); *H04W 72/005* (2013.01)

(58) Field of Classification Search
CPC ..... H04B 7/0456; H04L 5/006; H04W 72/005
See application file for complete search history.

(56) References Cited

U.S. PATENT DOCUMENTS

2013/0156125 A1* 6/2013 Ko ................... H04L 25/03949
375/267

FOREIGN PATENT DOCUMENTS

WO    WO 2017/069510 A1    4/2017

* cited by examiner

*Primary Examiner* — Curtis B Odom
(74) *Attorney, Agent, or Firm* — Birch, Stewart, Kolasch & Birch, LLP

(57) ABSTRACT

The invention relates to the transmitting of a public data to at least a number K of terminals in a wireless communication system employing a MIMO (Multiple Input Multiple Output) scheme, using a set of N pre-coders ($W_i$). The method includes, based on the N pre-coder ($W_i$), determining a set of N'≤N optimized pre-coders ($W'_i$) and, based on the set of N'≤N optimized pre-coders ($W'_i$), computing N' optimized resource unit quantities T'(i), the N' optimized pre-coders respectively corresponding to the N' optimized resource units quantities T'(i). The method further includes transmitting N' data $D_i$, each of the N' data being a part of the public data, such that, for i=1 to N', $D_i$ is transmitted on T'(i) resource units which are pre-coded onto $N_{Tx}$ antennas using the pre-coder $W'_i$.

13 Claims, 4 Drawing Sheets

(51) Int. Cl.
*H04L 5/00* (2006.01)
*H04W 72/00* (2009.01)

1

METHOD FOR TRANSMITTING, COMPUTER PROGRAM PRODUCT, AND TRANSMITTER

TECHNICAL FIELD

The present invention relates to the broadcasting or more generally to the multicasting of data in a wireless communication system employing a Multiple Input Multiple Output (MIMO) scheme.

BACKGROUND ART

It relates more precisely to optimization of the transmission of data when this data is multicast.

BACKGROUND ART

Traditionally networks which provide broadcast services define a given quality of service which delimits a coverage area. For example, in DVB standards a minimum level of signal-to-noise ratio (SNR) is defined. The receivers experiencing radio link condition leading to a SNR above this minimum can receive and demodulate the DVB signal. The receivers experiencing radio link condition leading to a SNR under this minimum cannot demodulate the DVB signal.

However, this approach is not efficient in terms of spectral efficiency especially when the emitter has knowledge of the channel quality observed by each user.

In more recent standard like LTE, the broadcast service, that is, the Evolved Multimedia Broadcast Multicast Service (eMBMS) is dynamic. Indeed, the emitter, also called the base station, receives the channel quality observed by each user, enabling the base station to adapt the transmission of the data intended for the receivers in its cell according to the instantaneous deployment of these receivers. Therefore, the base station can dynamically switch from broadcast (or multicast) to unicast: when broadcasting some data turns out to be less efficient than sending the same data on resources allocated individually to each receiver (user equipment also called terminals in the following) then the base station switch to a unicast transmission mode.

However, transmitting to several user equipments the same data using a unicast mode reduces the benefit of sharing the resource. Therefore, such an approach leads to inefficient use of the spectral band.

SUMMARY OF INVENTION

There is therefore a need to enhance the spectral efficiency of broadcast transmission (or multicast) or more generally the transmission of the same data to several receivers in wireless communication networks.

The present invention aims at improving the situation. To this end, the invention relates to a method for transmitting by a transmitter, comprising $N_{Tx}$ antennas, a public data to at least a number K of terminals in a wireless communication system employing a MIMO (Multiple Input Multiple Output) scheme, using a set of N pre-coder ($W_i$), said method comprising:

/a/ Based on the N pre-coders ($W_i$), determining a set of $N' \leq N$ optimized pre-coder ($W'_i$) and based on the set of $N' \leq N$ optimized pre-coder ($W'_i$), computing N' optimized resource units quantities T'(i), the N' optimized pre-coder ($W'_i$) respectively corresponding to the N' optimized resource units quantities T'(i);

/b/ Transmitting N' data $D_i$, each of the N' data being a part of the public data, such as, for i=1 to N', $D_i$ is transmitted on T'(i) resource units which are pre-coded onto $N_1$ antennas using the pre-coder $W'_i$.

This enables to enhance the spectral efficiency and to optimize the transmission of the public data to the K terminals in the context of a wireless communication system employing a MIMO scheme.

Indeed, the invention enables to transmit parts of a public data via the transmitter using different pre-coders, that is, using different pre-coding matrix. Therefore, each part of the public data is broadcasted (or multicasted) to the K terminals using a different pre-coding matrix, enabling to adapt to the instantaneous deployment of the K terminals. Thus, precoders (otherwise called the pre-coding matrix) and the quantity of data sent using each of the pre-coder can be optimized according to the channel quality returned by the terminals to reduce the radio resources needed to transmit the public data to the K terminals.

Therefore, the public data is divided according to the N' optimized resource units quantities (T'(i)) and each part of the public data ($D_i$) is transmitted according to one of the optimized pre-coders ($W'_i$). The optimized resource units quantities T'(i) are computed based on the optimized precoders $W'_i$ to enhance the broadcast/multicast transmission capacity regarding the K terminals.

Therefore, the method enables to enhance the spectral efficiency and power consumption for broadcast or multicast transmission.

The method proceeds to two optimizations, the first one being the optimization of the pre-coders $W_i$ into optimized pre-coders $W'_i$, the second one being the optimization of the distribution of the resource units used to transmit data with each optimized pre-coders $W'_i$. Therefore, the resource units computed depend on the pre-coders $W'_i$ determined. This greatly enhances the broadcast/multicast transmission capacity.

It is advantageous to enhance the spectral efficiency of multicast services, which can be done at the transmitter, with a dynamic optimization of the transmission capacity according to the knowledge of the channel condition experienced by each user, especially when multiple antenna techniques are used.

The transmitter is part of a wireless communication system employing MIMO schemes. Therefore, the transmitter uses multiple transmit antennas ($N_{TX}$ antennas) and the receivers, that is, the terminals may use several receive antennas. The transmission through the $N_{Tx}$ antennas is defined via the configuration of a pre-coding module, that is, by implementing specific pre-coders or pre-coding matrix.

The resource unit corresponds to the unit used by the transmitter to allocate the radio resources for downlink transmission. For example, in LTE the resource units are time-frequency resources called resource blocks.

By quantity of resource unit it is understood a number of resource unit. The quantity of optimized resource units T"(i) is therefore a number of resource units used to transmit the data $D_i$ (being part of the public data) using the optimized pre-coder $W'_i$. The sum of resource units quantities is chosen to be equal to the number of resource units $T_{pubdata}$ needed to transmit the public data. The size of the resource units $T_{pubdata}$ depends notably on the modulation and coding scheme (MCS) used to transmit the public data. This can easily be obtain by multiplying each resource units quantity by $T_{pubdata}/\Sigma T'(i)$.

The resource units used to transmit one part of public data $D_i$ can be distributed in time, in frequency or in both at the same time.

The resource units quantities and the pre-coders are optimized. The optimization is done according to the K terminals, that is, to the terminals to which the public data is intended to be sent. More specifically, the optimization is done according to the channel qualities of the channels linking the transmitter with each of the K terminals.

This channel quality can be represented by a matrix $H(k)$ ($1 \leq k \leq K$) of complex coefficients, each complex coefficient representing the instantaneous signal-to-noise-ratio of a radio channel between one of the transmitter's antenna and one of the k-th receiver's antenna. The instantaneous signal-to-noise ratio can vary quickly according to the small-scale fading of the radio propagation channel. The small-scale fading variation is mainly due to the moving scatterers and to the Doppler Effect when the terminal is moving. The average of said instantaneous signal-to-noise ratio is a long-term signal-to-noise that only varies according to the large-scale fading, i.e., when a terminal position changes more than several wavelength of the transmission signal. Thus, the matrix $H(k)$ represents the channel quality of the channel linking the k-th terminal with the transmitter.

The transmitter can obtain the channel quality of each terminal based on feedbacks given by each terminal, for example in the form of a pre-coder codebook index. In LTE, this pre-coder codebook index is the Pre-coding Matrix Indicator (PMI). Other method to determine the channel quality can be applied for example the transmitter can analyze the channel quality of the uplink channel linking the k-th terminal with the transmitter.

It is assumed that the channel quality observed by each terminal is constant on the bandwidth which is used to transmit the public data.

Like previously mentioned, the optimization of the resource units quantities and the optimization of the set of pre-coders is done to obtain a higher overall transmission capacity (overall channel capacity), that is, the sum of the transmission capacity (or channel capacity) experienced by each terminal. The optimized resource units quantities and the optimized pre-coders are generally not the combination of resource units quantities and pre-coders which ensure the best transmission capacity, but at least they enable to enhance the broadcast/multicast transmission capacity between the transmitter and the K terminals.

These optimization can be mathematically expressed by estimating the set of pre-coders and the set of resource units quantities respectively corresponding to the set of pre-coders which maximizes the formula:

$$\min_{1 \leq k \leq K} \left[ \frac{1}{\sum_{i=1}^{N'} T'(i)} * \sum_{i=1}^{N'} T'(i) * f(\|W_i' * H(k)\|^2) \right]$$

Like previously said the set of pre-coders and the set of resource units quantities that are computed are generally not the solution which maximizes the above formula, but only a close evaluation, that is an approximation.

By optimized resource units quantities it is understood a set of resource units quantities which are an evaluation of the solution which maximizes the formula:

$$\min_{0 < k < K+1} \left[ \frac{1}{\sum_{i=1}^{N'} T'(i)} * \sum_{i=1}^{N'} T'(i) * f(\|W_i' * H(k)\|^2) \right],$$

with the $(W'_i)$ known.

By a set of N' optimized pre-coders and a set of N' optimized resource units quantities T'(i) it is understood a set of pre-coders and a set of resource units quantities which are evaluations of the solution which maximizes the formula:

$$\min_{0 < k < K+1} \left[ \frac{1}{\sum_{i=1}^{N'} T'(i)} * \sum_{i=1}^{N'} T'(i) * f(\|W_i' * H(k)\|^2) \right] >$$

$$\min_{0 < k < K+1} \left[ \frac{1}{\sum_{i=1}^{N} T(i)} * \sum_{i=1}^{N} T(i) * f(\|W_i * H(k)\|^2) \right],$$

with the $(T(i))$ and the $(W_i)$ known.

The optimizations carried out by the invention, that is, the optimization of resource units quantities and the optimization of pre-coders, enhance the broadcast/multicast transmission capacity experienced by the K terminals. Indeed, knowing a set of resource units quantities T'(i) and a set pre-coder $W'_i$ that solve the following in equation:

$$\min_{0 < k \leq K} \left[ \frac{\sum_{i=1}^{N'} T'(i) * f(\|W_i' * H(k)\|^2)}{\sum_{i=1}^{N'} T'(i)} \right] >$$

$$\min_{0 \leq k \leq K} \left[ \frac{\sum_{i=1}^{N} T(i) * f(\|W_i * H(k)\|^2)}{\sum_{i=1}^{N} T(i)} \right]$$

(T(i) being resource units quantities non-optimized or optimized according to $W_i$)

involves that using these optimized sets enhance the capacity of the broadcast/multicast transmission.

Indeed, the performance metric f applied on $\|W*H(k)\|^2$ is an estimation of the channel capacity experienced by the terminal if the pre-coder W is used for the transmission. If the performance metric chosen is $$f(x) = \log_2(1 + x) \text{ then } \frac{T(i)}{\sum_{i=1}^{N} T(i)} * f(\|W * H(k)\|^2)$$

is close to the channel capacity stated in the Shannon-Hartley theorem. Therefore, the channel capacity experienced by the k-th terminal can be represented by $$\frac{T(i) * f(\|W_i * H(k)\|^2)}{\sum_{i=1}^{N} T(i)}$$

regarding the T(i) resource blocks and the global channel capacity experienced by the k-th terminal can be represented by $$\frac{\sum_{i=1}^{N} T(i) * f(\|W_i * H(k)\|^2)}{\sum_{i=1}^{N} T(i)}.$$

Thus, the N' optimized resource units quantities T'(i) and the sets optimized pre-coders that satisfy the above in equation enhance the worst channel capacity experienced by one of the K terminals. Since the transmission of the public data is done in a broadcast (or multicast) manner, enhancing the worst channel capacity is equivalent to enhancing the capacity of the transmission.

By enhancing the transmission capacity it is understood that based on the same amount of resource units used for the transmission of data transmitted with this amount of resource units is enhanced. Therefore, the optimization is valued based on constant overall resource units quantities $\Sigma_{i=1}^{N'} T'(i)$. However, the sum of resource units quantities is chosen to be equal to the number of resource units needed to transmit the public data.

To perform the optimization the transmitter may need to determine the channel quality experienced by each terminal, which may be defined for the k-th terminal by the matrix H(k). Therefore, the transmitter may receive information enabling it to determine H(k) or an approximation of it for each terminal. For example, the terminal can receive index indicating a pre-coder from a codebook (PMI—Pre-coding Matrix Indicator in LTE).

By public data it is understood data which are intended to be sent to the K terminals. That is, each of the K terminals is the recipient of the public data. The parts $D_i$, with i=1 to N', of the public data enable to retrieve the public data when put together. Therefore, the $D_i$ may constitute a partition of the public data.

According to an aspect of the invention, the determining of the set of optimized pre-coder comprises obtaining a merged pre-coder $MW_{i_1,i_2}$ which is obtained by merging the pre-coders $W_{i_1}$ and $W_{i_2}$. Advantageously, the merged pre-coder $MW_{i_1,i_2}$ is determined as bellow:

$$MW_{i_1,i_2} = \frac{\mu * W_{i_1} + (1-\mu) * W_{i_2}}{\|\mu * W_{i_1} + (1-\mu) * W_{i_2}\|}$$

With $\mu$ a number strictly smaller than 1 and strictly bigger than 0, $\|X\|^2$ being a square norm of the vector X. This enables to reduce the complexity and therefore reduce the computing needed to obtain the set of optimized pre-coder.

$MW_{i_1,i_2}$, $W_{i_1}$ and $W_{i_2}$ are matrix representing pre-coders. The number of rows in the matrix representing the pre-coders is equal to $N_{Tx}$. For reasons of simplification, the pre-coding matrix used in the following will be matrix with a unique row. That is, only the case with terminals with one receiving antenna is described. The person skilled in the art could easily adapt the implementation of the invention to the case where the terminals have more than one receiving antenna.

According to an aspect of the invention, the determining of the set of N' optimized pre-coder ($W'_i$), comprises:

/$a_1$/ for each pair (p, q) of $[\![1; N]\!]^2$, with p<q, computing N−1 optimized resource units quantities $T'_{p,q}(i)$, with i=1 ... N and i≠q, based on the N−2 pre-coders $$\{W_i\}_{\substack{i \in [\![1,N]\!] \\ i \neq p,q}}$$

and the merged pre-coder $MW_{p,q}$;

/$a_2$/ determining $$(m; m') = \mathrm{argmax}_{p,q}\left[\min_{0<k<K+1}\left[T'_{p,q}(p) * f(\|MW_{p,q} * H(k)\|^2) + \sum_{\substack{i=1 \\ i \neq p,q}}^{N} T'_{p,q}(i) * f(\|W_i * H(k)\|^2)\right]\right],$$

with f a performance metric and H(k) a matrix representing a channel quality of a channel linking the transmitter to a k-th terminal among the K terminals;

/$a_3$/ defining the set $$\{W_i\}_{\substack{i \in [\![1;N]\!] \\ i \neq m,m'}} \cup \{MW_{m,m'}\}$$

as the set of N' optimized pre-coder and $$\{T'_{m,m'}(i)\}_{\substack{i \in [\![1;N]\!] \\ i \neq m'}}$$

as me N' optimized resource units quantities, corresponding to $T'_{m,m'}(m)$ and N' equal to N−1.

This enables to select efficiently among the sets of N−1 pre-coders which are each obtained only by merging two pre-coders among the original set of N pre-coders. The complexity is therefore reduced to the computing of the N−1 optimized resource units quantities for each of the set of N−1 pre-coders obtained. Therefore, this enables to optimize the set of pre-coders and the resource units quantities while reducing the complexity of the computing by substituting several simple problems to a complex problem.

Argmax of a function stands for the arguments of the maxima of this function.

Advantageously, the set $$\{W_i\}_{\substack{i \in [\![1;N]\!] \\ i \neq m,m'}} \cup \{MW_{m,m'}\}$$

is defined as the set of N' optimized pre-coder and $$\{T'_{m,m'}(i)\}_{\substack{i \in [\![1;N]\!] \\ i \neq m'}}$$

is defined as the N' optimized resource units quantities if $$\min_{0,k<K+1}\left[\frac{1}{\sum_{i=1}^{N'} T'(i)} * T'_{m,m'}(m) * f(\|MW_{m,m'} * H(k)\|^2) + \right.$$

$$\left. \frac{1}{\sum_{i=1}^{N'} T'(i)} * \sum_{\substack{i=1 \\ i \neq m,m'}}^{N} T'_{m,m'}(i) * f(\|W_i * H(k)\|^2)\right] >$$

$$\min_{0,k<K+1}\left[\frac{1}{\sum_{i=1}^{N} T(i)} * \sum_{i=1}^{N} T(i) * f(\|W_i * H(k)\|^2)\right]$$

This enables to select a set of pre-coders only if the selected set provides a better overall transmission capacity than the original one. According to an aspect of the invention, for each pair (p,q) computing N−1 optimized resource units quantities comprises:

/$a_{11}$/ Computing a N−1×K size matrix $B_{p,q}$ with coefficients $B_{p,q}(i, k)$ for $(i;k) \in [\![1; N-1]\!] \times [\![1; K]\!]$, such as $$\begin{cases} B_{p,q}(i, k) = f(\|W_i * H(k)\|^2) \text{ for } i\in[\![1; q-1]\!], i \neq p, \text{ and } k\in[\![1; K]\!] \\ B_{p,q}(p, k) = f(\|MW_{p,q} * H(k)\|^2) \text{ for } k\in[\![1; K]\!] \\ B_{p,q}(i, k) = f(\|W_{i+1} * H(k)\|^2) \text{ for } i\in[\![q; N-1]\!], \text{ and } k\in[\![1; K]\!] \end{cases},$$

and a Moore-Penrose pseudo inverse matrix of $B_{p,q}$, $B_{p,q}^{\#}$;

/$a_{12}$/ Computing the vector $[S'_{p,q}(1), \ldots, S'_{p,q}(N-1)]$ such as $$[S'_{p,q}(1), \ldots, S'_{p,q}(N-1)] = \left[\frac{1}{N-1}, \ldots, \frac{1}{N-1}\right] \times B_{p,q} \times B_{p,q}^{\#}$$

/$a_{13}$/ Computing $T'_{p,q}(i) = \gamma \cdot \max(\min(S'_{p,q}(i),1), 0)$ for $i\in[\![1; q-1]\!]$ and $$T'_{p,q}(i) = \gamma \cdot \max(\min(S'_{p,q}(i-1),1),0) \text{ for } i\in[\![q+1;N]\!]$$

with γ a number strictly bigger than 0.

A Moore-Penrose pseudo inverse matrix ($B^{\#}$) of the matrix B, is defined for example in https://en.wikipedia.org/wiki/Moore-Penrose_inverse. In particular, when K≤N−1 and $B^H B$ has a full rank, then $B^{\#}=(B^H B)^{-1} B^H$, and when K≥N−1 and $BB^H$ has a full rank, then $B^{\#}=B^H (BB^H)^{-1}$.

$B^H$ is the conjugate transpose of a matrix B.

This enables to compute the N−1 optimized resource units quantities according to each set of N−1 pre-coders obtained only by merging two pre-coders among the original set of N pre-coders. This computation enables to obtain N−1 resource units quantities which are a good evaluation of the solution which maximizes the formula:

$$\min_{0<k<K+1}\left[\frac{1}{\sum_{i=1}^{N-1} T'(i)} * \sum_{i=1}^{N-1} T'(i) * f(\|V_i * H(k)\|^2)\right]$$

($V_i$) is one of the set obtained only by merging two pre-coders among the original set of N pre-coders.

The computation of the N−1 optimized resource units quantities is in the context of the invention a computation of low complexity and therefore enables to reduce the needed computing resources.

According to an aspect of the invention, the computing performed in

/$a_{12}$/ and the computing performed in /$a_{13}$/ are repeated in a loop, the N−1 size $$\text{vector}\left[\frac{T'_{p,q}(1)}{\sum_{\substack{i=1 \\ i\neq q}}^{N} T'_{p,q}(i)}, \ldots, \frac{T'_{p,q}(q-1)}{\sum_{\substack{i=1 \\ i\neq q}}^{N} T'_{p,q}(i)}, \frac{T'_{p,q}(q+1)}{\sum_{\substack{i=1 \\ i\neq q}}^{N} T'_{p,q}(i)}, \ldots, \frac{T'_{p,q}(N)}{\sum_{\substack{i=1 \\ i\neq q}}^{N} T'_{p,q}(i)}\right]$$

replacing the vector $$\left[\frac{1}{N-1}, \ldots, \frac{1}{N-1}\right]$$

when the computing performed in /$a_{12}$/ is repeated.

This enables to obtain a better evaluation (or approximation) of the solution which maximizes the formula:

$$\min_{0<k<K+1}\left[\frac{1}{\sum_{i=1}^{N-1} T'(i)} * \sum_{i=1}^{N-1} T'(i) * f(\|V_i * H(k)\|^2)\right]$$

That is, by repeating the computing of /$a_{12}$/ and /$a_{13}$/, the N−1 optimized resource units quantities computed are closer to the exact solution which maximizes the above formula.

According to an aspect of the invention, the determining of the set of N' optimized pre-coder ($W'_i$), comprises:

determining $$(m; m') = \underset{p,q}{\operatorname{argmax}}\left[T(p) + T(q) - \max_k\left(\frac{R - \sum_{\substack{i=1 \\ i\neq p, i\neq q}}^{N} T(i) * f(\|W_i * H(k)\|^2)}{f(\|MW_{p,q} * H(k)\|^2)}\right)\right],$$

with f a performance metric and H(k) a matrix representing a channel quality of a channel linking the transmitter to a k-th terminal among the K terminals, where $R=\min_{1\leq k\leq K} [\sum_{i=1}^{N} T(i) * f(\|W_i * H(k)\|^2)]$ and T(i), with i=1 to N, are N resource units quantities, the i-th resource units quantity T(i) corresponding to the i-th pre-coder $W_i$;

defining the set $$\{W_i\}_{\substack{i\in[\![1;N]\!] \\ i\neq m, m'}} \cup \{MW_{m,m'}\}$$

as me set of N' optimized pre-coder.

This enables to select the best optimized set of pre-coders among the sets of N−1 pre-coders, which are each obtained only by merging two pre-coders among the original set of N pre-coders, without computing for each of these sets of pre-coders the corresponding N−1 optimized resource units quantities. Therefore, the computing needed is reduced or the computing can be done faster which is important when the channel quality experienced by each terminal varies quickly.

This enables to select the best optimized set of pre-coders among the sets of N−1 pre-coders (which are each obtained only by merging two pre-coders among the original set of N pre-coders) based on the set that frees the more resource units (compared to the non-optimized set of N pre-coders) while maintaining the same transmission capacity on the undischarged resource units, which indicates a better spectral efficiency. The N−1 optimized resource units quantities computed on the basis of the selected set, will then redistribute all the resource units, including the freed resource units, in an optimized way, respectively to the N−1 pre-coders of the selected set.

Advantageously, the set $$\{W_i\}_{i\in[\![1;N]\!]\atop i\neq m,m'} \cup \{MW_{m,m'}\}$$

is defined as the set of N' optimized pre-coder if $$\min_{0<k<K+1}\left[\frac{1}{\sum_{i=1}^{N'}T'(i)}*T'_{m,m'}(m)*f(\|MW_{m,m'}*H(k)\|^2)+\right.$$

$$\left.\frac{1}{\sum_{i=1}^{N'}T'(i)}*\sum_{i=1\atop i\neq m,m'}^{N}T'_{m,m'}(i)*f(\|W_i*H(k)\|^2)\right] >$$

$$\min_{0<k<K+1}\left[\frac{1}{\sum_{i=1}^{N}T(i)}*\sum_{i=1}^{N}T(i)*f(\|W_i*H(k)\|^2)\right]$$

This enables to select a set of pre-coders only if the selected set provides a better overall transmission capacity than the original one.

According to an aspect of the invention, the determining of the set of optimized pre-coder ($W'_i$), comprises:

calculating for each such as:

$$W' = W + \rho \cdot \text{diag}(\min(\|e_1 W\|^2, 1), \ldots, \min(\|e_N W\|^2, 1))^{-1} \times$$

$$\left(\sum_{k=1}^{K}\left[\sum_{i=1}^{N}T(i)\cdot f(\|e_i WH(k)\|^2)\right]^{\tau}\right) \times$$

$$\sum_{k=1}^{K}\left(\frac{[\sum_{i=1}^{N}T(i)\cdot f(\|e_i WH(k)\|^2)]^{\tau-1}}{\log(2)}\sum_{i=1}^{N}T(i)\frac{e_i^h e_i WH(k)H(k)^H}{1+\|e_i WH(k)\|^2}\right)^{\frac{1}{\tau}-1}$$

With W' a matrix with W a matrix with $W = [W_1^T, \ldots, W_N^T]^T$, with f a performance metric, H(k) a matrix representing a channel quality of a channel linking the transmitter to a k-th terminal among the K terminals, $e_i = [0, \ldots, 1, \ldots, 0]$ with the 1 in the i-th position, ρ a number strictly smaller than 1 and strictly bigger than 0 and τ is a number smaller than −1, $X^H$ is the conjugate transpose of a matrix X, $X^T$ is the transpose of the matrix X and T(i), with i=1 to N, are N resource units quantities, the i-th resource units quantity T(i) corresponding to the i-th pre-coder $W_i$.

This also enables to determine a set of optimized pre-coders without computing a set of optimized resource units quantities, which limits the computing required. In addition, this determining is done without reducing the number of pre-coders, thus, when the N optimized resource units quantities are computed based on this set of optimized pre-coders, the improvement of the transmission capacity is potentially bigger. Indeed, the computation aims at maximizing the formula:

$$\min_{0<k<K+1}\left[\frac{1}{\sum_{i=1}^{N}T'(i)}*\sum_{i=1}^{N}T'(i)*f(\|W'_i*H(k)\|^2)\right]$$

Since this equation has N unknowns it has one more degree of freedom than the formulas obtained with a set of N−1 pre-coders. Therefore, this formula can potentially have more local maximums and a bigger overall maximum. This is all the more true as the number N of pre-coders originally used by the transmitter is small or the number of iterations of method is important.

The conjugate transpose of a matrix X, denoted $X^H$, is obtained from X by taking the transpose and then taking the complex conjugate of each entry. According to an aspect of the invention, the N' optimized resource units quantities T'(i) corresponding to the N' optimized pre-coder ($W'_i$) are obtained by /a$_1$/ Computing a N'×K size matrix B with coefficients B(i, k)=f($\|W'_i*H(k)\|^2$) for (i; k)∈[[1; N']]×[[1; K]], and a Moore-Penrose pseudo inverse matrix of B, $B^\#$;

/a$_2$/ Computing the vector [S'(1), ..., S'(N')] such as $$[S'(1), \ldots, S'(N')] = \left[\frac{1}{N'}, \ldots, \frac{1}{N'}\right] \times B \times B^\#;$$

/a$_3$/ Computing T'=γ·max(min(S'(i),1), 0), with γ a number strictly bigger than 0.

This enables to compute the N' optimized resource units quantities according to the set of N' optimized pre-coder. This computation enables to obtain a set of N' resource units quantities which is a good evaluation (approximation) of the solution which maximizes the formula:

$$\min_{0<k<K+1}\left[\frac{1}{\sum_{i=1}^{N'}T'(i)}*\sum_{i=1}^{N'}T'(i)*f(\|W'_i*H(k)\|^2)\right]$$

According to an aspect of the invention, the computing performed in

/a$_2$/ and the computing performed in /a$_3$/ are repeated in a loop, the vector $$\left[\frac{T'(i)}{\sum_{i=1}^{N'}T'(i)}, \ldots, \frac{T'(N')}{\sum_{i=1}^{N'}T'(i)}\right]$$

replacing the vector $$\left[\frac{1}{N'}, \ldots, \frac{1}{N'}\right]$$

when the computing performed in /a$_2$/ is repeated.

This enables to obtain a better evaluation of the solution which maximizes the formula:

$$\min_{0<k<K+1}\left[\frac{1}{\sum_{i=1}^{N'}T'(i)}*\sum_{i=1}^{N'}T'(i)*f(\|W'_i*H(k)\|^2)\right]$$

That is, by repeating the computing of /a$_2$/ and /a$_3$/, the N' optimized resource units quantities computed are closer to the exact solution which maximizes the above formula.

According to an aspect of the invention, the resource units quantities T(i), with i=1 to N, are previously computed, said computing comprises:

/I$_1$/ Computing a N×K size matrix A with coefficients A(i, k)=f(∥W$_i$*H(k)∥$^2$) for (i; k)∈〚1; N〛×〚1; K〛, and a Moore-Penrose pseudo inverse matrix of A, A$^\#$;

/I$_2$/ Computing the vector [S(1), . . . , S(N)] such as $$[S(1),\ldots,S(N)] = \left[\frac{1}{N},\ldots,\frac{1}{N}\right] \times A \times A^\#;$$

/I$_3$/ Computing T(i)=γ·max(min(S(i),1), 0), with γ a number strictly bigger than 0.

This enables to optimize the computation of the N resource units quantities according to the set of N pre-coder originally used by the transmitter. This computation enables to obtain a set of N resource units quantities which is a good evaluation of the solution which maximizes the formula:

$$\min_{0<k<K+1}\left[\frac{1}{\sum_{i=1}^{N}T(i)} * \sum_{i=1}^{N} T(i) * f(\|W_i * H(k)\|^2)\right]$$

This computation in the context of the invention is of low complexity and therefore enables to reduce the computing needed. These N resource units quantities obtained enable to enhance the efficiency of the optimization of the pre-coders performed in step /a/.

According to an aspect of the invention, the computing performed in /I$_2$/ and the computing performed in /I$_3$/ are repeated in a loop, the vector $$\left[\frac{T(1)}{\sum_{i=1}^{N}T(i)},\ldots,\frac{T(N)}{\sum_{i=1}^{N}T(i)}\right]$$

replacing the vector $$\left[\frac{1}{N},\ldots,\frac{1}{N}\right]$$

when the computing performed in /I$_2$/ is repeated.

This enables to obtain a better evaluation of the solution which maximizes the formula:

$$\min_{0<k<K+1}\left[\frac{1}{\sum_{i=1}^{N}T(i)} * \sum_{i=1}^{N} T(i) * f(\|W_i * H(k)\|^2)\right]$$

That is, by repeating the computing of /I$_2$/ and /I$_3$/, the N resource units quantities computed are closer to the exact solution which maximizes the above formula.

According to an aspect of the invention, the computing performed in /a/ is repeated in a loop, the N' optimized pre-coder (W'$_i$) replacing the N pre-coder (W$_i$) when the computing performed in /a/ is repeated.

By repeating the computing performed in /a/, the set of N' optimized pre-coder and the set of N' optimized resource units quantities obtained are better approximation of the theoretical solution which maximizes the formula:

$$\min_{0<k<K+1}\left[\frac{1}{\sum_{i=1}^{N'}T'(i)} * \sum_{i=1}^{N'} T'(i) * f(\|W'_i * H(k)\|^2)\right]$$

This enables to enhance the transmission capacity.

A second aspect of the invention concerns a computer program product comprising code instructions to perform the method as described previously when said instructions are run by a processor.

A third aspect of the invention concerns a transmitter for transmitting a data to at least a number K of terminals in a wireless communication system employing a MIMO (Multiple Input Multiple Output) scheme, the transmitter comprises:

N$_{Tx}$ antennas a processor; and a non-transitory computer-readable medium comprising instructions stored thereon, which when executed by the processor configure the transmitter to:

/a/ Based on the N pre-coder (W$_i$), determine a set of N'≤N optimized pre-coder (W'$_i$) and based on the set of N'≤N optimized pre-coder (W'$_i$), compute N' optimized resource units quantities T'(i), the N' optimized pre-coder (W'$_i$) respectively corresponding to the N' optimized resource units quantities T'(i);

/b/ Transmit N' data D$_i$, each of the N' data being a part of the public data, such as D$_i$ is transmitted on T'(i) resource units which are pre-coded onto N$_{Tx}$ antennas using the pre-coder W'$_i$.

The present invention is illustrated by way of example, and not by way of limitation, in the figures of the accompanying drawings, in which like reference numerals refer to similar elements.

DESCRIPTION OF EMBODIMENTS

Figure 1:
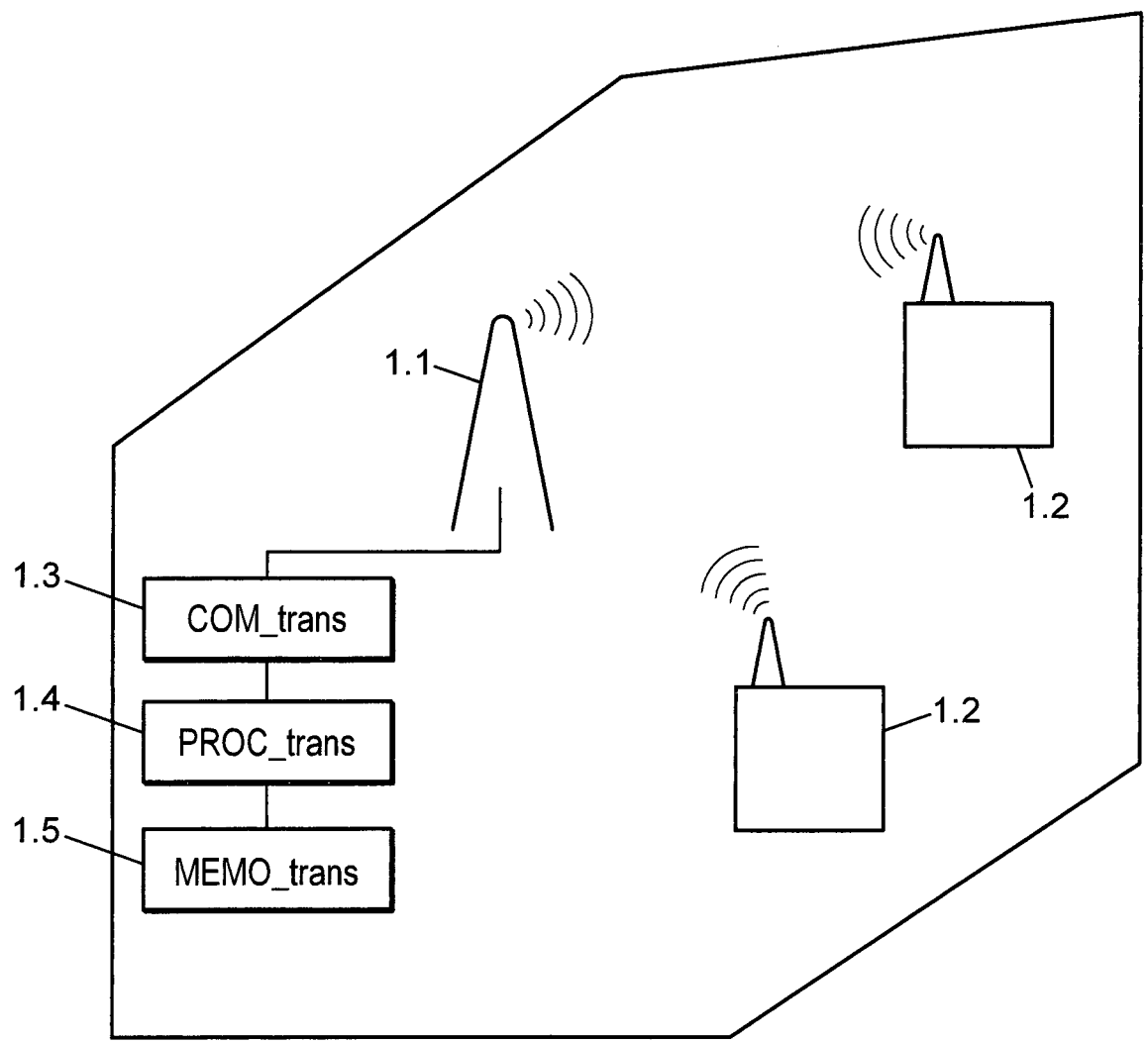
FIG. 1 illustrates a transmitter and K terminals according to the invention.

Referring to FIG. 1, there is shown a transmitter 1.1 transmitting a radio signal to several receivers 1.2. The receivers 1.2 are in the cell of the transmitter 1.1. This transmission may be an OFDM based transmission for example in the context of LTE-based system. In this example the receivers 1.2 are mobile terminals, also called terminals, and the transmitter 1.1 is a fixed station which in the context of LTE is a base station. In the context of the invention public data is intended to be sent to several terminals, that is, at least two terminals 1.2 are in the cell of the transmitter.

The transmitter 1.1 comprises one communication module (COM_trans) 1.3, one processing module (PROC_trans) 1.4 and a memory unit (MEMO_trans) 1.5. The MEMO_trans 1.5 comprises a non-volatile unit which retrieves the computer program and optimization algorithms and a volatile unit which may store the optimized pre-coders and the optimized resource units quantities. The PROC_trans 1.4 may be configured to determine the matrix H(k), determine the N' optimized pre-coder ($W'_i$), compute N' optimized resource units quantities T'(i), configures the COM_trans 1.3, configure the pre-coder module 2.0, divide the public data into N' data D transfer the parts of the public data $D_i$ to the COM_trans 1.3. The COM_trans 1.3 is configured to transmit to the receivers 1.2 the N' data $D_i$, each of the N' data being a part of the public data. The COM_trans 1.3 may include the pre-coder module 2.0. The processing module 1.4 and the memory unit 1.5 may comprise the processor and the non-transitory computer-readable medium of the transmitter. The processing module 1.4 and the memory unit 1.5 can be dedicated to the computing of the optimized resource units quantities and to the determining of the optimized pre-coder (/a/ and /b/) or also used for other functions of the transmitter like for processing the radio signal transmitting the public data. For example, by configuring the pre-coder module 2.0 of the transmitter 1.1 according to the set of optimized pre-coders, allocating the resource accordingly, dividing the public data according to the optimized resource units quantities and adapting the modulation scheme according to the channel quality.

Figure 2:
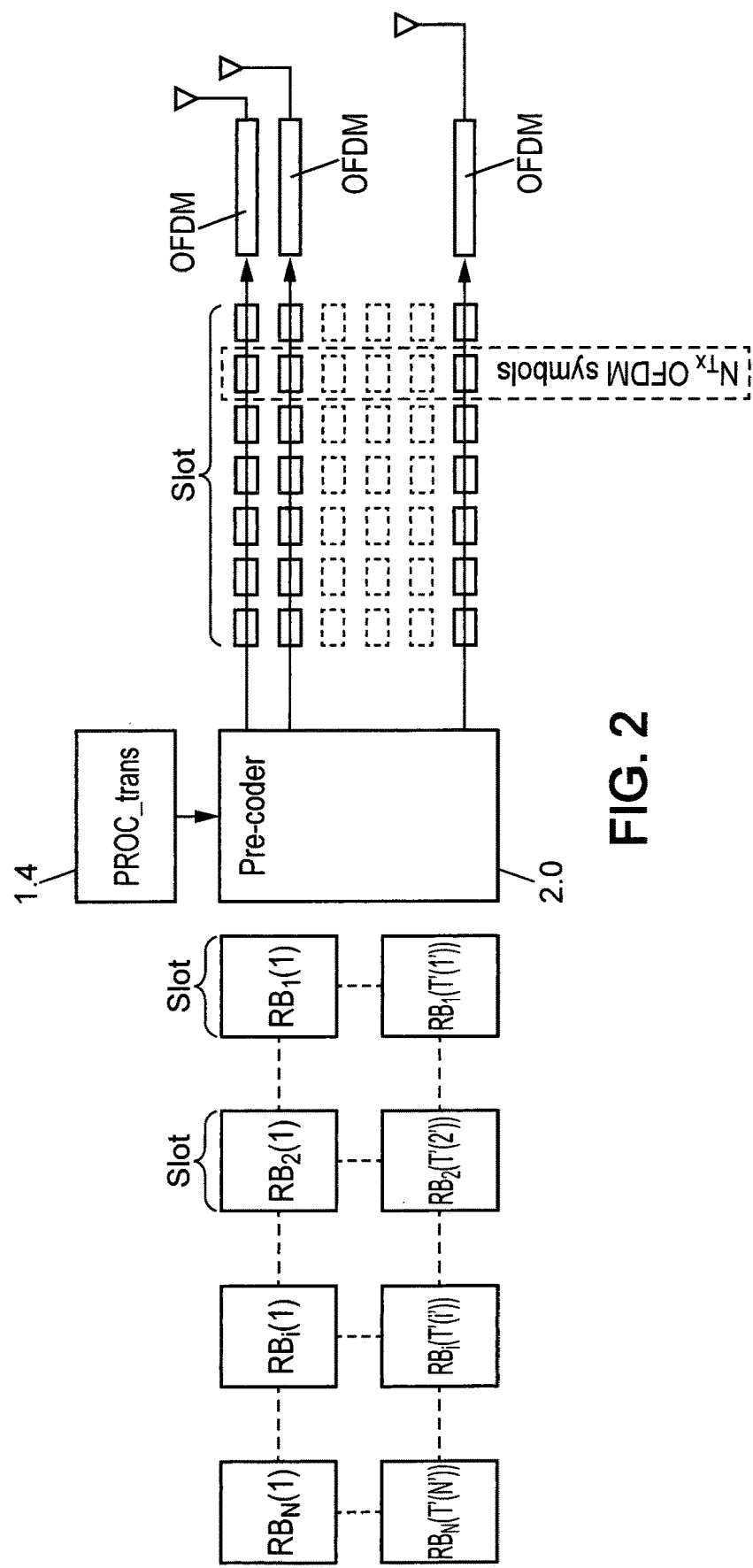
FIG. 2 illustrates a specific scheduling of resource units and a corresponding configuration of a pre-coder module according to an embodiment of the invention.

Referring to FIG. 2, there is shown a specific scheduling of resource units and a pre-coder module 2.0 which converts several symbols at the input of the pre-coder module 2.0 into several symbols on each antenna ports.

Once the N' optimized resource units T'(i) have been computed and the set of N' optimized pre-coders has been determined according to the invention, a quantity T'(1) of resource units are used to transmit a part $D_1$ of the public data. In the example of FIG. 2, it is shown an LTE-based system, therefore, the resource units are resource blocks. The symbols of the T'(1) resource blocks are pre-coded onto $N_{Tx}$ antenna ports with the pre-coder module 2.0 configured with the pre-coder $W'_1$. When all the symbols of the slot containing the T'(1) resource blocks are pre-coded, the pre-coder module 2.0 is configured with the pre-coder $W'_2$. Once configured the pre-coder module 2.0 pre-codes the symbols of the following slot, containing the T'(2) resource blocks used to transmit another part $D_2$ of the public data, onto $N_{Tx}$ antenna ports. The process is repeated until the symbols of the last group of T'(N') resource blocks are pre-coded onto the $N_{Tx}$ antenna ports with the pre-coder module 2.0 configured with the pre-coder $W'_{N'}$. Therefore, the pre-coding module 2.0 pre-codes the symbols of each group of resource blocks (the T'(i) resource blocks) with a different configuration, that is a different pre-coder. Thus, the scheduling of the resource blocks needs to be done according to this scheme to be synchronized with the changes of the configurations of the pre-coding module 2.0.

The configuration of the pre-coder module 2.0 can be done by the PROC_trans 1.4. The quantity T'(i) of resource blocks which are used to transmit the public data part $D_i$ may be superior than the maximum number of resource blocks in one slot, then the T'(i) resource blocks are distributed into two or more slots, the configuration of the pre-coder module 2.0 is then done accordingly, that is, when the pre-coder module 2.0 pre-codes the symbols related to these slots the pre-coder modules 2.0 is in the same configuration $W'_i$.

However, the scheduling and the configuration of the pre-coder module 2.0 are implemented in a time manner. That is, the pre-coder module 2.0 is configured the same way for all the resource blocks of a same slot. Conversely, the resource blocks from two different groups of resource blocks (for example, the group of T'(m) resource blocks used to transmit the $D_m$ part of the public data and the group of T'(n) resource blocks used to transmit the $D_n$ part of the public data) are not scheduled in the same slot.

The way the public data is divided into the ($D_i$) with i from 1 to N' depends on the set of optimized resource units quantities T'(i) and on the modulation and coding schemes (MCS) which are used to code the data in each group of resource blocks. Indeed, in a group of resource blocks whose symbols are pre-coded with a pre-coder W' having a low value of $f(\|W'^*H(k)\|^2)$ the MCS index chosen must be small to enable a correct transmission. That is, the modulation scheme will be more robust and the coding rate will be smaller, thus, the poor channel quality will be compensated but the transmission rate will be low, expressing the fact that the channel capacity is poor. Conversely, in a group of resource blocks whose symbols are pre-coded with a pre-coder W' having a high value of $f(\|W'^*H(k)\|^2)$ the MCS index chosen may be high, to enable to have a high transmission rate. That is, the modulation scheme will be less robust and the coding rate will be bigger, thus the high channel quality will enable to have a high transmission rate, expressing the fact that the channel capacity is good.

Therefore, the data $D_i$ may be encoded on T'(i) resource units using an MCS index sufficiently small to enable the terminal among the K terminals with the poorest channel transmission regarding the pre-coder W', to receive the data. That is, setting the MCS index for the T'(i) resource units according to $\min_k f(1|W'_i{}^*H(k)\|^2)$. Therefore, the total amount of resource units ΣT'(j) is set up according to the size of the public data and to the MCS index respectively chosen for each group of T'(i) resource units. The total amount of data that can be transmitted using the N' groups of T'(i) resource units can be expressed by $\Sigma \gamma_j T'(j)$, with $\gamma_j$ dependent on the MCS index used for the T'(j) resource units and $\gamma_j T'(j)$ represents the total amount of data (payload data) that the T'(j) resource units can transmit using the pre-coder $W'_j$. The public data is then divided according to the $\gamma_j T'(j)$.

In practice, all the $D_i$ are conjointly encoded with one MCS throughout all the resource units. That is, the MCS chosen is small enough to enable the terminal among the K terminal with the poorest overall channel transmission to receive the data. That is, setting the MCS index for the ΣT'(j) resource units such that the number of bits of the sum of the data $D_i$ (that is, the size of the public data), divided by the number of resource units used for transmitting the public data (that is, $\Sigma_{i=1}^{N'} T'(i)$) is equal to:

$$\min_{0<k<K+1}\left[\frac{1}{\Sigma_{i=1}^{N'} T'(i)} * \sum_{i=1}^{N'} T'(i) * f(\|W'_i * H(k)\|^2)\right].$$

The way the encoding of the $D_i$ is conjointly implemented is well known by the skilled person.

Therefore, the public data is divided in N' parts of data according to the maximum payload data that each group of resource blocks can transmit. If the sum of the maximum payload data each group of resource blocks can transmit is below the size of the public data, the quantities T'(i) can be divided by ΣT'(j) and multiplied by a value λ sufficiently big.

In addition, the invention can be implemented with antennas ports implementing another scheme than an Orthogonal frequency-division multiplexing (OFDM) scheme.

Figure 3:
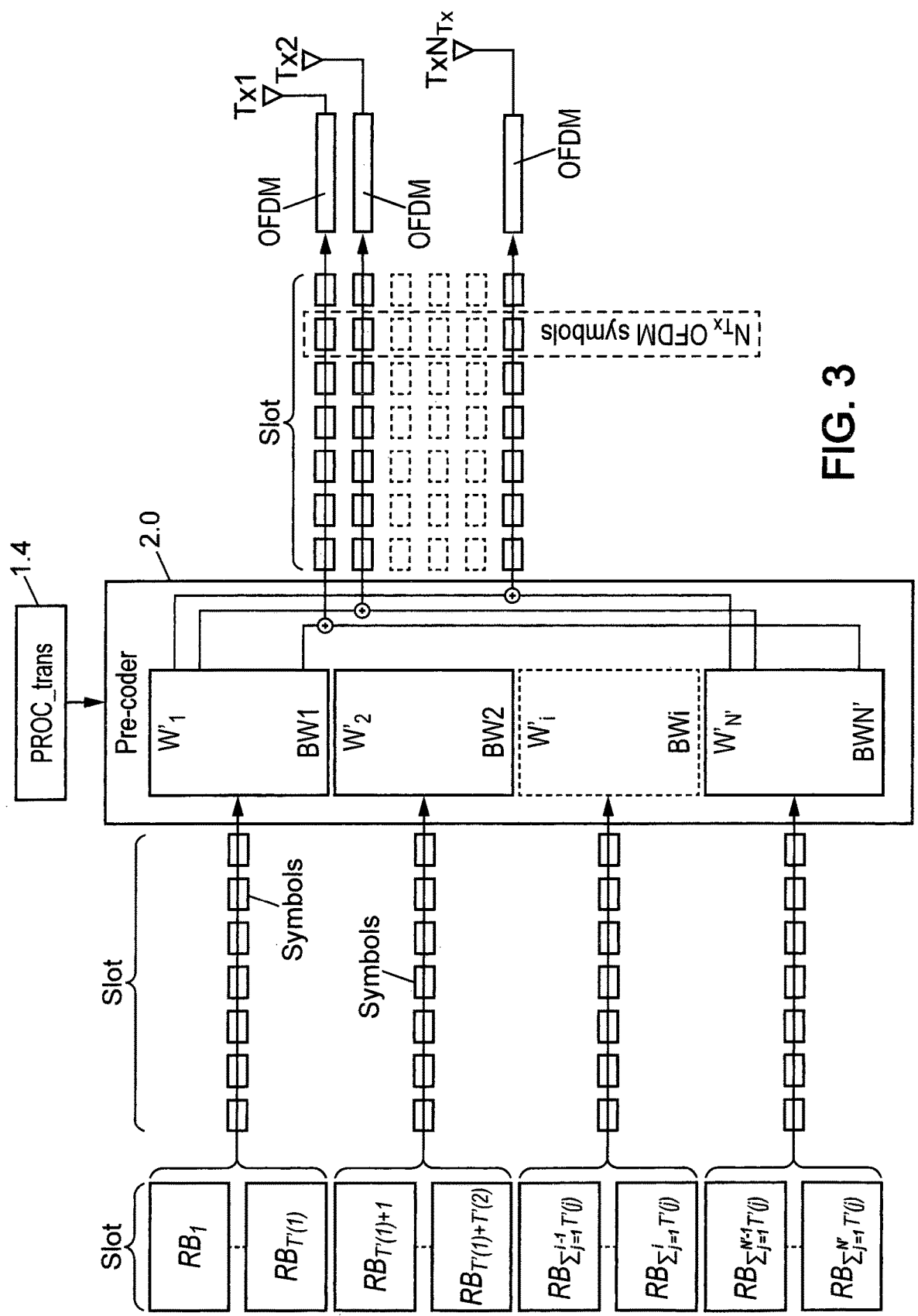
FIG. 3 illustrates another specific scheduling of resource units and a corresponding configuration of a pre-coder module according to an embodiment of the invention.

Referring to FIG. 3, there is shown another specific scheduling of resource units and a pre-coder module 2.0 which converts several symbols at the input of the pre-coder module 2.0 into several symbols on each antenna ports.

Like in the embodiment of FIG. 2, once the N' optimized resource units quantities T'(i) have been computed and the set of N' optimized pre-coders has been determined according to the invention, the pre-coder module 2.0 is configured by the PROC_trans 1.4 and the resource blocks are scheduled as detailed hereafter.

In contrary, to the embodiment of FIG. 2, the resource blocks used to transmit the N' data parts $D_i$ of the public data are processed at the same time, that is, in the case of a LTE-based system in the same slot. In addition, the pre-coder module 2.0 is configured jointly with different pre-coders or different pre-coder matrix, depending on the input bandwidth. The pre-coder module 2.0 process the resource blocks according to the part of the bandwidth in which they are.

More specifically, considering the bandwidth divided in sub-bandwidth $BW_i$, with i=1 to N', the parts of the symbols carried by the subcarriers in the first bandwidth $BW_1$ are processed with the pre-coder $W'_1$, the parts of the symbols carried by the subcarriers in the i-th bandwidth $BW_i$ are processed with the pre-coder $W'_i$ and the parts of the symbols carried by the subcarriers in the N'-th bandwidth $BW_{N'}$ are processed with the pre-coder $W'_{N'}$. The size of each bandwidth $BW_i$ is equal or bigger to the size required to carry, in the same slot, the T'(i) resource blocks which are used to transmit $D_i$.

In other words, the T'(i) resource blocks are carried by subcarriers with frequencies included in the $BW_i$. Therefore, the T'(i) resource blocks that are transmitted through the $BW_i$ are processed with the pre-coder $W'_i$.

At the output of the pre-coder module 2.0, the outputs of the pre-coding of the symbols of each group of T'(i) resource blocks are multiplexed together on each antenna port. That is, the symbols on one of the antenna ports are identical, regarding the subcarriers in the $BW_i$, to the result of the pre-coding of the part of the symbols containing the T'(i) resource blocks onto the same antenna port.

Therefore, the pre-coding module 2.0 pre-codes the symbols of each group of resource blocks with a single configuration. Thus, the scheduling of the resource blocks needs to be done according to the described scheme, that is, the T'(i) resource blocks must be scheduled in the $BW_i$.

The configuration of the pre-coder module 2.0 can be done by the PROC_trans 1.4. The quantity T'(i) of resource blocks may be superior to the maximum number of resource blocks in the $BW_i$ in one slot, in this case the T'(i) resource blocks are distributed into two or more slots in the same $BW_i$.

In the implementation of FIG. 3, the scheduling and the configuration of the pre-coder module 2.0 are implemented in a frequency manner. That is, the configuration of the pre-coder module 2.0 and the scheduling of each T'(i) resource blocks are done according to the partition of the global bandwidth in sub-bandwidths ($BW_i$).

The way the public data is divided into the ($D_i$), with i from 1 to N', is identical as in the implementation of FIG. 2, that is, the partition of the public data depends on the set of optimized resource units quantities T'(i) and to the modulation and coding schemes (MCS) which are used to code the data in each group of resource blocks (in practice only one MCS is chosen for the encoding on all the resource units used for the transmission of the public data). The quantities T'(i) can be divided by ΣT'(j) and multiplied by a value λ sufficiently big, if the sum of the maximum payload data each group of resource blocks can transmit is below the size of the public data.

The implementation of FIG. 2, which is a time manner implementation and the implementation of FIG. 3, which is a frequency manner implementation, can be combined. That is, the configuration of the pre-coder module 2.0 can change through time and the configurations used to process the resource blocks in one slot can use all or at least several optimized pre-coding matrix among the set of optimized pre-coding matrix.

Figure 4:
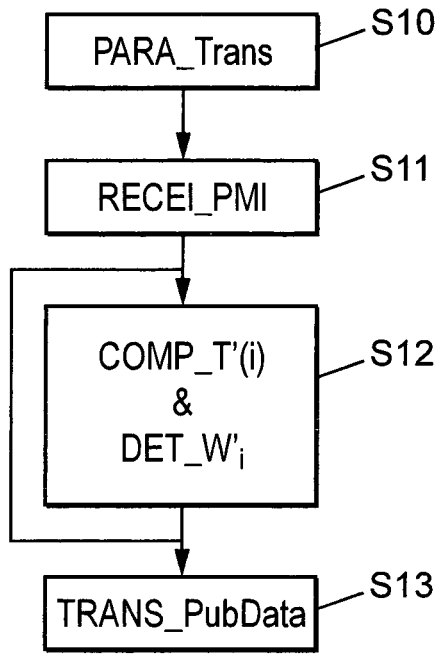
FIG. 4 illustrates a flowchart representing the optimizing steps according to an embodiment of the invention.

Referring to FIG. 4, there is shown a flowchart of the optimizing steps according to an embodiment of the invention.

At step S10 the transmitter is parametrized, that is, a set of N pre-coder ($W_i$) and the optimization algorithms are stored in the transmitter's 1.1 memory, for example the MEMO_trans 1.5.

The initial set of pre-coders is for example generated from a Discrete Fourier Transform (DFT) matrix. For example, the initial set of pre-coders can be obtained by:

generating a DFT matrix of size max($N_{Tx}$,N)×max($N_{Tx}$, N). For example, the DFT matrix can be the matrix $M_{DFT}$ with the elements $$\left(e^{\frac{-2\pi i s t}{max(N_{Tx},N)}}\right)_{\substack{s=0 \text{ to } max(N_{Tx},N) \\ t=0 \text{ to } max(N_{Tx},N)}}.$$

when $N_{Tx}$<N, the i-th pre-coder is the i-th row of the matrix obtained by keeping only the $N_{Tx}$ first columns of $M_{DFT}$, when $N_{Tx}$≥N, the i-th pre-coder is the i-th row of the matrix obtained by keeping only N rows of $M_{DFT}$ These N rows are chosen with indexes as equally spaced as possible.

The initial set of pre-coders can also be obtained, when N=K, by defining for each k-th terminal the k-th pre-coding matrix $W_k$ as the eigen-beamforming vector, that is, the pre-coding matrix that maximizes the point-to-point capacity toward the k-th terminal. For example, $W_k$ can be set as the matched filter $$\frac{H(k)^H}{\|H(k)\|}.$$

At step S11 the PROC_trans 1.4 may determine the matrix H(k). Indeed, as previously mention the transmitter may need to determine the channel quality experienced by each of the K terminals. These channel qualities may be defined for each k-th terminal by the matrix H(k). For this purpose the transmitter may receive information enabling it to determine the H(k) matrix, for example the transmitter can receive from each of the K transmitters an index indicating a pre-coder from a codebook, which is the PMI in LTE systems. Like previously mentioned, other methods can be used to determine the channel quality, for example the transmitter can analyze the channel quality of the uplink channel with the k-th terminal.

At step S12 the PROC_trans 1.4 may determine a set of N' optimized pre-coder ($W'_i$), with and N'≤N and compute N' optimized resource units quantities T'(i), with i=1 to N'. The (W'$_i$) respectively corresponding to the T'(i).

The computing of the N' optimized resource units quantities T'(i) and the determining of the set of N' optimized pre-coders (W'$_i$), are done based on the N pre-coder (Wi).

In addition, the determining of the set of N' optimized pre-coders (W'$_i$) and the computing of the N' optimized resource units quantities T'(i) may be performed by:

for each pair (p, q) of ⟦1; N⟧$^2$, with p<q, computing N−1 optimized resource units quantities T'$_{p,q}$(i), with i=1 . . . N and i≠q, based on the N−2 pre-coders $$\{W_i\}_{\substack{i\in\llbracket 1;N\rrbracket \\ i\neq p,q}}$$

and a merged pre-coder MW$_{p,q}$;
determining $$(m; m') = \text{argmax}_{p,q}\left[\min_{0<k<K+1}\left[T'_{p,q}(p) * f(\|MW_{p,q} * H(k)\|^2) + \sum_{\substack{i=1 \\ i\neq p,q}}^{N} T'_{p,q}(i) * f(\|W_i * H(k)\|^2)\right]\right],$$

with f a performance metric and H(k) a matrix representing the channel quality of a channel linking the transmitter to a k-th terminal among the K terminals;

defining the set $$\{W_i\}_{\substack{i\in\llbracket 1;N\rrbracket \\ i\neq m,m'}} \cup \{MW_{m,m'}\}$$

as the set of N' optimized pre-coders and $$\{T_{m,m'}(i)\}_{\substack{i\in\llbracket 1;N\rrbracket \\ i\neq m'}}$$

as me N' optimized resource units quantities, MW$_{m,m'}$ corresponding to T'$_{m,m'}$(m) and N' equal to N−1.

The merged pre-coder MW$_{p,q}$ is obtained by merging the pre-coders W$_p$ and W$_q$. For example, the merged pre-coder MW$_{p,q}$ is determined as bellow:

$$MW_{p,q} = \frac{\mu * W_p + (1-\mu) * W_q}{\|\mu * W_p + (1-\mu) * W_q\|}$$

With μ a number strictly smaller than 1 and strictly bigger than 0, ‖X‖$^2$ being a square norm of the vector X.

The step of computing N−1 optimized resource units quantities T'$_{p,q}$(i) i=1 . . . N and i≠q based on the N−2 pre-coders $$\{W_i\}_{\substack{i\in\llbracket 1;N\rrbracket \\ i\neq p,q}}$$

and the merged pre-coder MW$_{p,q}$ may be performed by:

Computing a N−1×K size matrix B$_{p,q}$ with coefficients B$_{p,q}$(i, k) for (i; k)∈⟦1; N−1⟧×⟦1; K⟧, such as $$\begin{cases} B_{p,q}(i, k) = f(\|W_i * H(k)\|^2) & \text{for } i\in\llbracket 1; q-1\rrbracket, i \neq p, \text{ and } k\in\llbracket 1; K\rrbracket \\ B_{p,q}(p, k) = f(\|MW_{p,q} * H(k)\|^2) & \text{for } k\in\llbracket 1; K\rrbracket \\ B_{p,q}(i, k) = f(\|W_{i+1} * H(k)\|^2) & \text{for } i\in\llbracket q; N-1\rrbracket \text{ and } k\in\llbracket 1; K\rrbracket \end{cases}$$

and a Moore-Penrose pseudo inverse matrix of B$_{p,q}$, B$_{p,q}$$^#$;
Computing the vector [S'$_{p,q}$(1), . . . , S'$_{p,q}$(N−1)] such as $$[S'_{p,q}(1), \ldots, S'_{p,q}(N-1)] = \left[\frac{1}{N-1}, \ldots, \frac{1}{N-1}\right] \times B_{p,q} \times B_{p,q}^\#$$

Computing T'$_{p,q}$(i)=γ·max(min(S'$_{p,q}$(i),1), 0) for i∈⟦1; q−1⟧ and
T'$_{p,q}$(i)=γ·max(min(S'$_{p,q}$(i−1),1) 0) for i∈⟦q+1; N⟧ with γ a number strictly bigger than 0.

These steps may be repeated in a loop, that is, the second and third steps are repeated using the N−1 size vector $$\left[\frac{T'_{p,q}(1)}{\sum_{\substack{i=1 \\ i\neq q}}^{N} T'_{p,q}(i)}, \ldots, \frac{T'_{p,q}(q-1)}{\sum_{\substack{i=1 \\ i\neq q}}^{N} T'_{p,q}(i)}, \frac{T'_{p,q}(q+1)}{\sum_{\substack{i=1 \\ i\neq q}}^{N} T'_{p,q}(i)} \cdots \frac{T'_{p,q}(N)}{\sum_{\substack{i=1 \\ i\neq q}}^{N} T'_{p,q}(i)}\right]$$

to replace the vector $$\left[\frac{1}{N-1}, \ldots, \frac{1}{N-1}\right]$$

or me previous computed set of T'(i) with i=1, . . . , N−1.

The step S12 may be repeated in a loop, with the N−1 optimized pre-coder (W'$_i$) replacing the N pre-coder (W$_i$) when step S12 is repeated.

At step S13 the PROC_trans 1.4 configures the COM_trans 1.3 according to the set of optimized pre-coders determined (W'$_i$) and to the optimized resource units quantities T'(i). For example, the PROC_trans 1.4 may configure the pre-coder module 2.0.

The PROC_trans 1.4 divides the public data into N' data D$_i$. This partitioning of the public data is done according to the set of optimized resource units quantities T'(i) and to the modulation and coding schemes (MCS) which are used to code the data in each group of resource blocks (in practice only one MCS is chosen for the encoding on all the resource units used for the transmission of the public data).

When a unique, MCS is chosen for all the resource units used for the transmission of the public data, the MCS can be chosen advantageously such that the number of bits of the sum of the data D$_i$, divided by the number of resource used for transmitting the public data is equal to $$\min_{0<k<K+1}\left[\frac{1}{\sum_{i=1}^{N'} T'(i)} * \sum_{i=1}^{N'} T'(i) * f(\|W'_i * H(k)\|^2)\right].$$

If the total quantity of resource units (ΣT'(i)) is not enough to transmit the public data, then each T'(i) can be divided by ΣT'(j) and multiplied by a value λ sufficiently big.

The PROC_trans 1.4 transfers the parts of the public data $D_i$ to the COM_trans 1.3. Each $D_i$ are respectively set in the resource blocks of the groups of T'(i) resource blocks, with i=1 . . . N', scheduled according to the configuration of the pre-coder module 2.0. Therefore, the data $D_i$ is sent in T'(i) resource blocks which are pre-coded onto $N_{Tx}$ antennas using the pre-coder W'$_i$.

Figure 5:
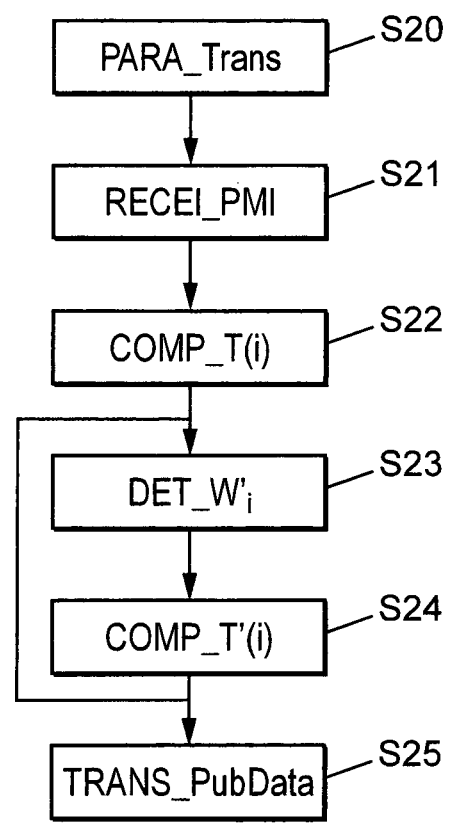
FIG. 5 illustrates a flowchart representing the optimizing steps according to an embodiment of the invention.

Referring to FIG. 5, there is shown a flowchart of the optimizing steps according to an embodiment of the invention.

At step S20 the transmitter is parametrized, that is, a set of N pre-coder ($W_i$) and the optimization algorithms are stored in the transmitter's 1.1 memory, for example the MEMO_trans 1.5.

At step S21 the PROC_trans 1.4 may determine the matrix H(k). Indeed, as previously mentioned, the transmitter may need to determine the channel quality experienced by each of the K terminals. These channel qualities may be defined for each k-th terminal by the matrix H(k). For this purpose the transmitter may receive information enabling it to determine the H(k) matrix, for example the transmitter can receive from each of the K transmitters an index indicating a pre-coder from a codebook, which is the PMI in LTE systems. Like previously mentioned, other method can be used to determine the channel quality, for example the transmitter can analyze the channel quality of the uplink channel with the k-th terminal.

At step S22 the PROC_trans 1.4 may compute the N resource units quantities T(i), with i=1 . . . N, each of these resource units quantity T(i) corresponds to the i-th pre-coder Wi. This computation of the T(i), with i=1 . . . N, is based on the N pre-coder ($W_i$).

This computing may be performed by:

Computing a N×K size matrix A with coefficients A (i, k)=f*($\|W_i*H(k)\|^2$) for (i; k)∈⟦1; N⟧×⟦1; K⟧, and a Moore-Penrose pseudo inverse matrix of A, $A^\#$;

Computing the vector [S(1), . . . , S(N)] such as $$[S(1), \ldots, S(N)] = \left[\frac{1}{N}, \ldots, \frac{1}{N}\right] \times A \times A^\#;$$

Computing T(i)=γ·max(min(S(i),1), 0), with γ a number strictly bigger than 0.

These steps may be repeated in a loop, that is, the second and third steps are repeated using the vector $$\left[\frac{T(1)}{\sum_{i=1}^N T(i)}, \ldots, \frac{T(N)}{\sum_{i=1}^N T(i)}\right]$$

to replace the vector $$\left[\frac{1}{N}, \ldots, \frac{1}{N}\right]$$

or the previous computed set of T(i) with i=1 . . . N.

At step S23 the PROC_trans 1.4 may determine a set of N' optimized pre-coder (W'$_i$), with i=1 . . . N' and N'≤N.

The determining of the set of N' optimized pre-coder (W'$_i$), are done based on the N resource units quantities and the N pre-coder ($W_1$).

In addition, the determining of the set of N' optimized pre-coder (W'$_i$) may be performed by:

determining $$(m; m') = \underset{p,q}{\mathrm{argmax}}\left[T(p) + T(q) - \max_k\left(\frac{R - \sum_{\substack{i=1 \\ i \ne p, i \ne q}}^N T(i) * f(\|W_i * H(k)\|^2)}{f(\|MW_{p,q} * H(k)\|^2)}\right)\right],$$

with f a performance metric and H(k) a matrix representing a channel quality of a channel linking the transmitter to a k-th terminal among the K terminals, where R=$\min_{i \le k \le K}$ [$\sum_{i=1}^N T(i)*f(\|W_i*H(k)\|^2)$] and T(i), with i=1 to N, are N resource units quantities, the i-th resource units quantity T(i) corresponding to the i-th pre-coder $W_i$;

defining the set $$\{W_i\}_{\substack{i \in \llbracket 1;N \rrbracket \\ i \ne m,m'}} \cup \{MW_{m,m'}\}$$

as the set of N' optimized pre-coder.

The merged pre-coder $MW_{m,m'}$ is obtained by merging the pre-coders $W_m$ and $W_{m'}$. For example, the merged pre-coder $MW_{m,m'}$ is determined as bellow:

$$MW_{m,m'} = \frac{\mu * W_m + (1-\mu) * W_{m'}}{\|\mu * W_m + (1-\mu) * W_{m'}\|}$$

With μ a number strictly smaller than 1 and strictly bigger than 0, $\|X\|^2$ being a square norm of the vector X.

In an alternative, the determining of the set of N' optimized pre-coder (W'$_i$) may be performed by:

calculating for each i, W'$_i$ such as:

$$W' = W + \rho \cdot \mathrm{diag}(\min(\|e_1 W\|^2, 1), \ldots, \min(\|e_N W\|^2, 1))^{-1} \times$$

$$\left(\sum_{k=1}^K \left[\sum_{i=1}^N T(i) \cdot f(\|e_i W H(k)\|^2)\right]^\tau\right) \times$$

$$\sum_{k=1}^K \left(\frac{[\sum_{i=1}^N T(i) \cdot f(\|e_i W H(k)\|^2)]^{\tau-1}}{\log(2)} \sum_{i=1}^N T(i) \frac{e_i^h e_i W H(k) H(k)^H}{1 + \|e_i W H(k)\|^2}\right)^{\frac{1}{\tau}-1}$$

With W' a matrix with W'=[W'$_1^T$, . . . , W'$_N^T$]$^T$, W a matrix with W=[$W_1^T$, . . . , $W_N^T$]$^T$, with f a performance metric, H(k) a matrix representing a channel quality of a channel linking the transmitter to a k-th terminal among the K terminals, $e_i$=[0, . . . , 1, . . . , 0] with the 1 in the i-th position, ρ is a number strictly smaller than 1 and strictly bigger than 0 and τ is a number smaller than −1, $X^H$ is the conjugate transpose of a matrix X, $X^T$ is the transpose of the matrix X and T(i), with i=1 to N, are N resource units quantities, the i-th resource units quantity T(i) corresponding to the i-th pre-coder $W_i$. Here, N' is equal to N.

Advantageously, τ has a high absolute value, for example −10. ρ which impacts the convergence of the algorithm is advantageously chosen very small.

At step S24 the PROC_trans 1.4 may compute N' optimized resource units quantities T(i), with i=1 to N'.

The computing of the N' optimized resource units quantities T'(i) is done based on the N' pre-coder (W'$_i$).

In addition, the computing of the N' optimized resource units quantities T'(i) may be performed by:
Computing a N'×K size matrix B with coefficients B(i, k)=f(‖W'$_i$*H(k)‖$^2$) for (i;k)∈〚 1; N'〛×〚 1; K〛, and a Moore-Penrose pseudo inverse matrix of B, B$^\#$;
Computing the vector [S'(1), ..., S'(N')] such as $$[S'(1), \ldots, S'(N')] = \left[\frac{1}{N'}, \ldots, \frac{1}{N'}\right] \times B \times B^\#;$$

Computing T'(i)=γ·max(min(S'(i), 1), 0), with γ a number strictly bigger than 0.
These steps may be repeated in a loop, that is, the second and third steps are repeated using the N' size vector $$\left[\frac{T'(1)}{\Sigma_{i=1}^{N'} T'(i)}, \ldots, \frac{T'(N')}{\Sigma_{i=1}^{N'} T'(i)}\right]$$

to replace the vector $$\left[\frac{1}{N'}, \ldots, \frac{1}{N'}\right]$$

or the previous computed set of T'(i) with i=1, ..., N−1.
The steps S23 and S24 may be repeated in a loop, with the optimized pre-coders (W'$_i$) replacing the pre-coders (W$_i$) and the T'(i) replacing the T(i) when step S23 is repeated.
At step S25 the PROC_trans 1.4 configures the COM_trans 1.3 according to the set of optimized pre-coders determined (W'$_i$) and to the optimized resource units quantities T'(i). For example, the PROC_trans 1.4 may configure the pre-coder module 2.0.
The PROC_trans 1.4 divides the public data into N' data D$_i$. This partitioning of the public data is done according to the set of optimized resource units quantities T'(i) and to the modulation and coding schemes (MCS) which are used to code the data in each group of resource blocks (in practice only one MCS is chosen for the encoding on all the resource units used for the transmission of the public data).
If the total quantity of resource units (ΣT'(i)) is not enough to transmit the public data, then each T'(i) can be divided by ΣT'(j) and multiplied by a value λ sufficiently big.
The PROC_trans 1.4 transfers the parts of the public data D$_i$ to the COM_trans 1.3. Each D$_i$ are respectively set in the resource blocks of the groups of T'(i) resource blocks, with i=1 . . . N', scheduled according to the configuration of the pre-coder module 2.0. Therefore, the data D$_i$ is sent in T'(i) resource blocks which are pre-coded onto N$_{Tx}$ antennas using the pre-coder W'$_i$.
Of course, the present invention is not limited to the examples of embodiments described in details above, but encompasses also further alternative embodiments.
For example, when repeating the step S13 the invention can be implemented by replacing the step S13 by S23 and S24, therefore alternating the embodiment of FIG. 4 and of FIG. 5. Conversely, when repeating the steps S23 and S24 the invention can be implemented by replacing the steps S23 and S24 by the step S13.

The invention claimed is:
1. A method for transmitting by a transmitter, comprising N$_{Tx}$ antennas, a data D to at least a number K of terminals in a wireless communication system employing a MIMO (Multiple Input Multiple Output) scheme, using a set of N pre-coders (W$_i$), with 1<N, said method comprising:
/a/ Based on the N pre-coders (W$_i$), determining a set of N'≤N optimized pre-coders (W'$_i$) and based on the set of N'≤N optimized pre-coders (W'$_i$), computing N' optimized resource units quantities T'(i), the N' optimized pre-coders (W'$_i$) respectively corresponding to the N' optimized resource units quantities T'(i);
/b/ Transmitting N' data D$_i$, each of the N' data being a part of the data D, such as, for i=1 to N', D$_i$ is transmitted on T'(i) resource units which are pre-coded onto N$_{Tx}$ antennas using the pre-coder W'$_i$,
wherein the determining of the set of optimized pre-coder comprises obtaining a merged pre-coder MW$_{i_1,i_2}$ which is obtained by merging the pre-coders W$_{i_1}$,W$_{i_2}$ and
wherein the merged pre-coder MW$_{i_1,i_2}$ is determined as below:

$$MW_{i_1,i_2} = \frac{\mu * W_{i_1} + (1-\mu) * W_{i_2}}{\|\mu * W_{i_1} + (1-\mu) * W_{i_2}\|}$$

With μ a number strictly smaller than 1 and strictly bigger than 0, ‖X‖$^2$ being a square norm of the vector X.
2. The method according to claim 1, wherein the determining of the set of N' optimized pre-coders (W'$_i$), comprises:
/a$_1$/ for each pair (p, q) of 〚 1; N〛$^2$, with p and q being indices identifying respective ones of the N pre-coders such that MW$_{p,q}$ represents a merged pre-coder obtained by merging pre-coders W$_p$ and W$_q$, and p<q, computing N−1 optimized resource units quantities T'$_{p,q}$ (i), with i=1 . . . N and i≠q, based on the N−2 pre-coders $$\{W_i\}_{\substack{i \in 〚1;N〛 \\ i \neq p,q}}$$

and the merged pre-coder MW$_{p,q}$;
/a$_2$/determining $$(m; m') = \underset{p,q}{\mathrm{argmax}}\left[\min_{0<k<K+1}\left[T'_{p,q}(p) * f(\|MW_{p,q} * H(k)\|^2) + \Sigma_{\substack{i=1 \\ i \neq p,q}}^{N} T'_{p,q}(i) * f(\|W_i * H(k)\|^2)\right]\right],$$

where m and m' are indices representing a merged pre-coder MW$_{m,m'}$ determined from among the merged pre-coders MW$_{p,q}$ in /a$_1$/to be included in the set of N' optimized pre-coders (W'$_i$), with f being a performance metric and H(k) being a matrix representing a channel quality of a channel linking the transmitter to a k-th terminal among the K terminals;
/a$_3$/defining the set $$\{W_i\}_{\substack{i \in 〚1;N〛 \\ i \neq m,m'}} \cup \{MW_{m,m'}\}$$

as the set of N' optimized pre-coders and $$\{T'_{m,m'}(i)\}_{\substack{i \in [\![1;N]\!] \\ i \neq m'}}$$

as the N' optimized resource units quantities, $MW_{m,m'}$ corresponding to $T'_{m,m'}(m)$ and N' equal to N−1.

3. The method according to claim 2, wherein for each pair (p,q) computing N−1 optimized resource units quantities comprises:
/a$_{11}$/ Computing a N−1×K size matrix $B_{p,q}$ with coefficients $B_{p,q}(i, k)$ for $(i;k) \in [\![1; N-1]\!] \times [\![1; K]\!]$, such as $$\begin{cases} B_{p,q}(i, k) = f(\|W_i * H(k)\|^2) \text{ for } i \in [\![1; q-1]\!], i \neq p, \text{ and } k \in [\![1; K]\!] \\ B_{p,q}(p, k) = f(\|MW_{p,q} * H(k)\|^2) \text{ for } k \in [\![1; K]\!] \\ B_{p,q}(i, k) = f(\|W_{i+1} * H(k)\|^2) \text{ for } i \in [\![q; N-1]\!] \text{ and } k \in [\![1; K]\!] \end{cases},$$

and a Moore-Penrose pseudo inverse matrix of $B_{p,q}$, $B_{p,q}^{\#}$;
/a$_{12}$/Computing the vector $[S'_{q,p}(1), \ldots S'_{p,q}(N-1)]$ such as $$[S'_{p,q}(1), \ldots, S'_{p,q}(N-1)] = \left[\frac{1}{N-1}, \ldots, \frac{1}{N-1}\right] \times B_{p,q} \times B_{p,q}^{\#};$$

/a$_{13}$/ Computing $T'_{p,q}(i) = \gamma \cdot \max(\min(S'_{p,q}(i),1), 0)$ for $i \in [\![1; q-1]\!]$ and
$T'_{p,q}(i) = \gamma \cdot \max(\min(S'_{p,q}(i-1),1),0)$ for $i \in [\![q+1;N]\!]$ with $\gamma$ a number strictly bigger than 0.

4. The method according to claim 3, wherein the computing performed in /a$_{12}$/and the computing performed in /a$_{13}$/ are repeated in a loop, the N−1 size vector $$\left[\frac{T'_{p,q}(1)}{\sum_{\substack{i=1 \\ i \neq q}}^{N} T'_{p,q}(i)}, \ldots, \frac{T'_{p,q}(q-1)}{\sum_{\substack{i=1 \\ i \neq q}}^{N} T'_{p,q}(i)}, \frac{T'_{p,q}(q+1)}{\sum_{\substack{i=1 \\ i \neq q}}^{N} T'_{p,q}(i)}, \ldots, \frac{T'_{p,q}(N)}{\sum_{\substack{i=1 \\ i \neq q}}^{N} T'_{p,q}(i)}\right]$$

replacing the vector $$\left[\frac{1}{N-1}, \ldots, \frac{1}{N-1}\right]$$

when the computing performed in /a$_{12}$/ is repeated.

5. The method according to claim 1, wherein the determining of the set of N' optimized pre-coders (W'$_i$), comprises:
determining $$(m; m') = \underset{p,q}{\mathrm{argmax}}\left[T(p) + T(q) - \underset{k}{\max}\left(\frac{R - \sum_{\substack{i=1 \\ i \neq p, i \neq q}}^{N} T(i) * f(\|W_i * H(k)\|^2)}{f(\|MW_{p,q} * H(k)\|^2)}\right)\right],$$

with p and q being indices identifying respective ones of the N pre-coders such that $MW_{p,q}$ represents a merged pre-coder obtained by merging pre-coders $W_p$ and $W_q$, m and m' being indices representing a merged pre-coder $MW_{m,m'}$ to be included in the set of N' optimized pre-coders (W'$_i$) f being a performance metric and H(k) being a matrix representing a channel quality of a channel linking the transmitter to a k-th terminal among the K terminals, where $$R = \underset{1 \leq k \leq K}{\min}\left[\sum_{i=1}^{N} T(i) * f(\|W_i * H(k)\|^2)\right]$$

and T(i), with i=1 to N, are N resource units quantities, the i-th resource units quantity T(i) corresponding to the i-th pre-coder $W_i$;
defining the set $$\{W_i\}_{\substack{i \in [\![1;N]\!] \\ i \neq m, m'}} \cup \{MW_{m,m'}\}$$

as the set of N' optimized pre-coder.

6. The method according to claim 5, wherein the N' optimized resource units quantities T'(i) corresponding to the N' optimized pre-coder (W'$_i$) are obtained by /a$_1$/ Computing a N'×K size matrix B with coefficients B(i k)=f$(\|W'_i * H(k)\|^2)$ for (i;k); $\in [\![1; N-1]\!] \times [\![1; K]\!]$, and a Moore-Penrose pseudo inverse matrix of B, $B^{\#}$;
/a$_2$/ Computing the vector $[S'(1), \ldots, S'(N')]$ such as $$[S'(1), \ldots, S'(N')] = \left[\frac{1}{N'}, \ldots, \frac{1}{N'}\right] \times B \times B^{\#};$$

/a$_3$/ Computing $T'(i) = \gamma \cdot \max(\min(S'(i),1), 0)$, with $\gamma$ a number strictly bigger than 0.

7. The method according to claim 6, wherein the computing performed in /a$_2$/and the computing performed in /a$_3$/are repeated in a loop, the vector $$\left[\frac{T'(1)}{\sum_{i=1}^{N'} T'(i)}, \ldots, \frac{T'(N')}{\sum_{i=1}^{N'} T'(i)}\right]$$

replacing the vector $$\left[\frac{1}{N'}, \ldots, \frac{1}{N'}\right]$$

when the computing performed in /a$_2$/ is repeated.

8. The method according to claim 5, wherein the resource units quantities T(i), with i=1 to N, are previously computed, said computing comprises:
/l$_1$/ Computing a N×K size matrix A with coefficients A(i, k)=f$(\|w_i * H(k)\|^2)$ for (i;k); $\in [\![1; N-1]\!] \times [\![1; K]\!]$, and a Moore-Penrose pseudo inverse matrix of A, $A^{\#}$;
/l$_2$/ Computing the vector $[S(1), \ldots, S(N)]$ such as $$[S(1), \ldots, S(N)] = \left[\frac{1}{N}, \ldots, \frac{1}{N}\right] \times A \times A^{\#};$$

/l$_3$/ Computing $T(i) = \gamma \cdot \max(\min(S(i),1), 0)$, with $\gamma$ a number strictly bigger than 0.

9. The method according to claim 8, wherein the computing performed in /I$_2$/and the computing performed in /I$_3$/ are repeated in a loop, the vector $$\left[\frac{T(1)}{\sum_{i=1}^{N} T(i)}, \ldots, \frac{T(N)}{\sum_{i=1}^{N} T(i)}\right]$$

replacing the vector $$\left[\frac{1}{N}, \ldots, \frac{1}{N}\right]$$

when the computing performed in /I$_2$/ is repeated.

10. The method according to claim 1, wherein the computing performed in /a/ is repeated in a loop, the N' optimized pre-coder (W'$_i$) replacing the N pre-coders (W$_i$) when the computing performed in /a/ is repeated.

11. A non-transitory computer readable medium storing code instructions to perform the method according to claim 1, when said instructions are run by at least a processor.

12. A transmitter for transmitting a data D to at least a number K of terminals in a wireless communication system employing a MIMO (Multiple Input Multiple Output) scheme, using a set of N pre-coders (W$_i$) with 1<N, the transmitter comprises:

N$_{Tx}$ antennas;

a processor; and a non-transitory computer-readable medium comprising instructions stored thereon, which when executed by the processor configure the transmitter to:

/a/ Based on the N pre-coder (W$_i$) determine a set of N'≤N optimized pre-coder (W'$_i$) and based on the set of N'≤N optimized pre-coder (W'$_i$), compute N' optimized resource unit quantities T'(i), the N' optimized pre-coder (W'$_i$) respectively corresponding to the N' optimized resource units quantities T'(i);

/b/ Transmit N' data D$_i$, each of the N' data being a part of the data D, such as D$_i$ is transmitted on T'(i) resource units which are pre-coded onto N$_{Tx}$ antennas using the pre-coder W'$_i$, wherein the determining of the set of optimized pre-coder comprises obtaining a merged pre-coder MW$_{i_1,i_2}$ which is obtained by merging the pre-coders W$_{i_1}$ and W$_{i_2}$, and wherein the merged pre-coder MW$_{i_1,i_2}$ is determined as below:

$$MW_{i_1,i_2} = \frac{\mu * W_{i_1} + (1-\mu) * W_{i_2}}{\|\mu * W_{i_1} + (1-\mu) * W_{i_2}\|}$$

With μ a number strictly smaller than 1 and strictly bigger than 0, ‖X‖$^2$ being a square norm of the vector X.

13. A method for transmitting by a transmitter, comprising N$_{Tx}$ antennas, a data D to at least a number K of terminals in a wireless communication system employing a MIMO (Multiple Input Multiple Output) scheme, using a set of N pre-coders (W$_i$), with 1<N, said method comprising:

/a/Based on the N pre-coders (W$_i$), determining a set of N'≤N optimized pre-coders (W'$_i$) and based on the set of N'≤N optimized pre-coders (W'$_i$), computing N' optimized resource units quantities T'(i), the N' optimized pre-coders (W'$_i$) respectively corresponding to the N' optimized resource units quantities T'(i);

/b/Transmitting N' data D$_i$, each of the N' data being a part of the data D, such as, for i=1 to N', D$_i$ is transmitted on T'(i) resource units which are pre-coded onto N$_{Tx}$ antennas using the pre-coder W'$_i$, wherein the determining of the set of optimized pre-coders (W'$_i$), comprises:

calculating for each i, W'$_i$ such that:

$$W' = W + \rho.\text{diag}(\min(\|e_1 W\|^2, 1), \ldots, \min(\|e_N W\|^2, 1))^{-1} \times$$

$$\left(\sum_{k=1}^{K} \left[\sum_{i=1}^{N} T(i).f(\|e_i WH(k)\|^2)\right]^{\tau}\right) \times$$

$$\sum_{k=1}^{K} \left(\frac{\left[\sum_{i=1}^{N} T(i).f(\|e_i WH(k)\|^2)\right]^{\tau-1}}{\log(2)} \sum_{i=1}^{N} T(i) \frac{e_i^h e_i WH(k)H(k)^H}{1 + \|e_i WH(k)\|^2}\right)^{\frac{1}{\tau-1}}$$

With W' a matrix with W'=[W'$_1^T$, ..., W'$_N^T$]$^T$, W a matrix with W=[W$_1^T$, ..., W$_N^T$]$^T$, with f a performance metric, H(k) a matrix representing a channel quality of a channel linking the transmitter to a k-th terminal among the K terminals, e$_i$=[0, ..., 1, ..., 0] with the 1 in the i-th position, ρ is a number strictly smaller than 1 and strictly bigger than 0 and τ is a number smaller than −1, X$^H$ is the conjugate transpose of a matrix X, X$^T$ is the transpose of the matrix X and T(i), with i=1 to N, are N resource units quantities, the i-th resource units quantity T(i) corresponding to the i-th pre-coder W$_i$.

* * * * *